May 3, 1960   B. F. MIESSNER   2,934,988
TUNED REED
Filed Sept. 27, 1955
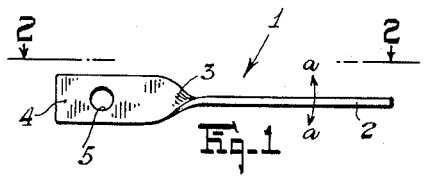
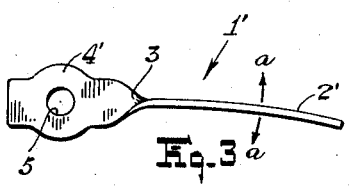
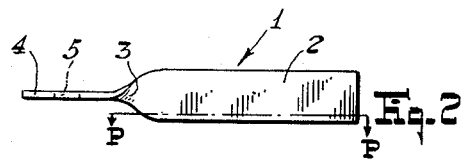
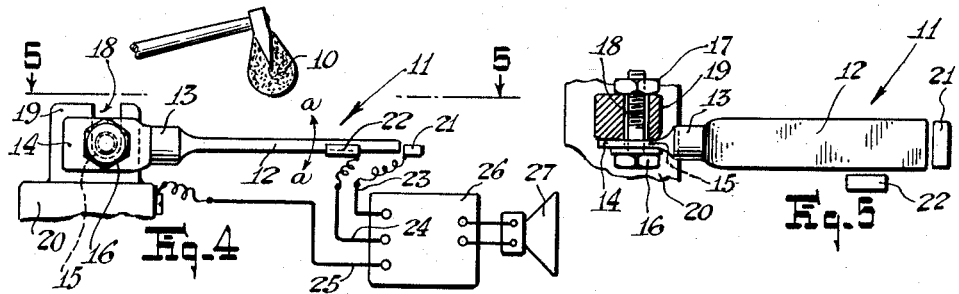
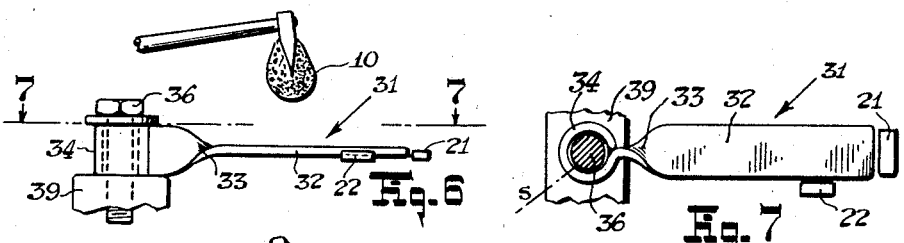
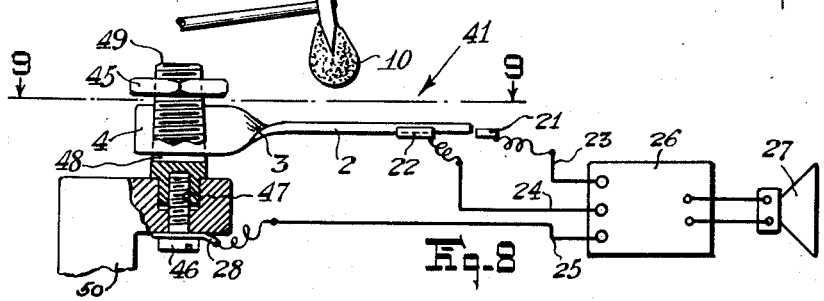
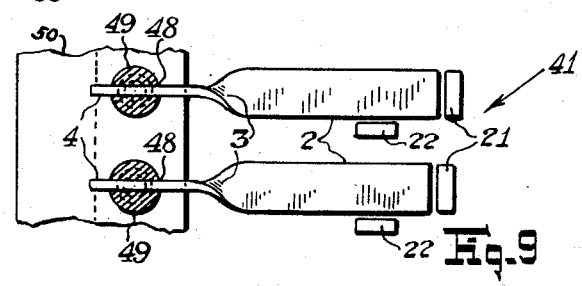
INVENTOR
Benjamin F. Miessner
BY Charles I. Jacobs, Atty.

United States Patent Office 2,934,988
Patented May 3, 1960

2,934,988

TUNED REED

Benjamin F. Miessner, Harding Township, Morris County, N.J., assignor, by mesne assignments, to The Wurlitzer Company, Chicago, Ill., a corporation of Ohio Application September 27, 1955, Serial No. 536,796

11 Claims. (Cl. 84—1.04)

This invention relates to tuned reeds, and more specifically to those of the fixed-free type (i.e., clamped at one end and free at the other). It is principally illustrated and described with relation to an electronic musical instrument wherein the vibrations of a tuned reed or tuned reeds are translated into electric oscillations, which may in turn be translated into sound, but it is not in all aspects limited thereto.

In typical uses of fixed-free tuned reeds it is often of substantial importance that there be minimized the rate of loss of their vibratory energy. In the case of impulsively excited (e.g., struck or plucked) reeds such minimization of course prolongs the duration of their vibrations. In the case of reeds sustained in vibration by the periodic application of vibratory forces, it is of importance in order that the magnitude of the required such forces (as well as intra-cyclic deviations from sinusoidality of the reed vibration, and the like) be kept low.

It is an object of this invention to provide a reed structure in which the rate of loss of the reed's vibratory energy is minimized.

It is an object of the invention to provide such a reed structure which is readily and simply formable from commonly available metal (or other workable) stock.

It is an object of the invention to provide a combination of reed structure and mounting base therefor in which the rate of loss of the reed's vibratory energy is minimized.

It is an object of the invention to provide such a combination in which the components are readily and simply formable and assemblable.

It is an object of the invention to provide such a combination of reed and mounting base in which the reed is readily and precisely adjustable into the desired spaced relationship to mechanico-electric translating apparatus disposed adjacent a portion or portions of the reed displaced from the base to which the reed is mounted.

It is an object of the invention generally to provide a combination of reed and mounting base therefor facilitating such adjustment, relative to adjacent mechanico-electric translating apparatus, as last above referred to.

It is an object of the invention to provide an improved mounting-base structure for a vibratory reed.

Other and allied objects will more fully appear from the following description and the appended claims.

In the description of my invention hereinafter set forth reference is had to the accompanying drawings, in which:

Figure 1 is a view, typically but not necessarily elevational, of a reed structure embodying my invention;

Figure 2 is a view taken along the line 2—2 of Figure 1;

Figure 3 is a view generally similar to Figure 1 but illustrating a typical deviation of the active portion of the reed from a plane state;

Figure 4 is a view of which a portion is generally similar to Figure 1 and of which the remainder is schematic, showing a modified form of reed according to my invention mounted to a base and having associated therewith typical mechanico-electric translating apparatus;

Figure 5 is a view taken along the line 5—5 of Figure 4;

Figure 6 is a view of the same nature as Figure 4, showing a modified form of reed structure and a portion of a typical base appropriate thereto;

Figure 7 is a view taken along the line 7—7 of Figure 6;

Figure 8 is a view of the same nature as Figure 4, showing a reed structure substantially identical with that of Figure 1, together with a preferred base structure therefor; and Figure 9 is a view taken along the line 9—9 of Figure 8, showing by way of example the presence of a plurality of reeds, as would be the case in a typical musical instrument.

A fixed-free reed may be considered as comprising two portions: one, a "lug portion" which is in some manner to be secured to a reed-mounting base; the other, an elongated "active portion" extending in cantilever from the lug portion and adapted for vibration transverse to its length. Frequently the two portions are integral, and in the simplest case the lug portion may be a direct extension of the active portion, of identical cross-section and orientation. In other cases the lug portion may be thickened in a direction parallel to that in which the active portion vibrates, which may be done either with an integral reed structure (wherein, for example, the active portion may be machined down to a smaller thickness than the lug portion) or with an assembled structure (wherein, for example, the lug portion is welded to the active portion or to an extension of the latter, or is formed thereon in the manner disclosed in my co-pending application Serial No. 291,829, filed June 5, 1952).

The thickening of the lug portion in the direction parallel to that in which the reed vibrates does reduce the rate of loss or abstraction of the reed's vibratory energy. The thickening of course greatly increases the stiffness in the stated direction. As a result there are minimized tendencies of the reed material, in its vibratory deformation, to slip microscopically along the base to which it is mounted and thus to provoke a frictional or similar energy loss; further, there is maximized the tendency for vibratory energy, incident to the transverse vibration but longitudinally propagated within the reed and reaching the lug portion, to be reflected from the latter and thus to remain within the reed rather than being transmitted through the lug portion to the base to which the reed is mounted.

One simple measure of the rate of loss is the length of time through which vibration of the active portion of the reed, following impulse excitation of given strength, will continue—the greater such length of time the smaller being the rate of loss. Working in terms of this measure, I have found with typical reeds that an increase of the thickness of the lug portion from equality with the transverse dimension of the active reed portion in the direction of its vibration, to a thickness of some three times that dimension, results in an approximate trebling of the vibration time—and that further increase of that lug thickness results in some further time increase, but at a sharply diminishing rate, so that the benefits of the thickening in typical cases have been largely exhausted when the lug thickness has been carried to between three and four times the abovementioned dimension of the active reed portion.

From the abovementioned typical manners of achieving the lug thickening it will be appreciated that substantial operations (e.g., machining, welding, etc.) are involved, with attendant unfavorable cost impact—particularly in the case of a musical instrument having a respective reed for each note of a many-octave scale.

I have, however, found that the advantages of the lug thickening may be achieved without such operations, and in a very simple and inexpensive manner.

Reference now being had to Figures 1 and 2, there will be seen a reed structure designated generally as 1, and having the elongated active portion 2. The lug portion of the structure is designated as 4, and it will be understood that this portion is intended to be secured to the reed-mounting base (not shown in these figures), as by clamping by means of a screw passing through the hole 5 provided for the purpose in the lug portion 4. In these figures the reed is shown as of substantially rectangular cross-section, being simply a piece of material of such section, and in Figure 1 the line $a$—$a$ indicates the direction (in this case, that of the minor transverse dimension of the active portion) in which it is intended that the active portion shall be vibrated.

It will be observed that the lug portion 4 is also of substantially rectangular cross-section, it too being simply a piece of material of such section. The major transverse dimension of the lug portion is, however, substantially parallel to a plane (indicated by the line $p$—$p$) in Figure 2) passing longitudinally through the active reed portion parallel to the direction ($a$—$a$) of its vibration. Such plane is alternatively definable as a plane passing longitudinally through the active reed portion at right angles to the maximum transverse dimension of that portion.

The relative orientations of lug and active portions thus defined may be readily achieved by the simple expedient of providing a reed portion 3, preferably short, between lug and active portions, and twisting this intervening portion 3 through substantially a right angle. The three portions 2, 3 and 4 may be respective portions of a single initially flat and rectangularly cross-sectioned element, for example of metal, on which the only operation required (other than for tuning, and the provision of the hole 5) is the twisting just described—preferably followed merely by suitable heat treating to relieve strains imparted to the material by the twisting.

A reed structure as so described accomplishes a result essentially identical, in minimizing the rate of abstraction of the reed's vibratory energy, to that achieved by a lug portion—obviously relatively massive, and requiring elaborate machining or other operations—of the same width as that of the active portion of the reed and of thickness equal to the major transverse dimension (i.e., that vertically shown in Figure 1) of the lug portion 4.

It will be understood that the vibration of the active portion will extend into the twisted portion, in a degree rapidly diminishing from that part of the latter which is adjacent the active portion to that part which is adjacent the lug portion. Thus the presence of the twisted portion may be considered as slightly increasing the effective length of the active portion—but this merely affects the tuning, as to which it is obviously readily compensable, and has no deleterious effect whatever.

In the simple case, just described, respective transverse cross-sections through the material of the three portions will be essentially identical—though no unnecessary limitation to this is intended. Thus in Figure 3 I have shown a reed structure 1' wherein, in order to leave more material peripherally around the mounting hole 5, the material of the lug portion—here designated as 4'—is at least around that hole made wider than the material of the rest of the reed structure.

Figure 3 also illustrates an active portion 2' modified from 2 of the former figures in that to it has been imparted a gradual smooth curvature, for example for purposes of altering the otherwise inherent inharmonic frequency relationship between second and first partials of the vibration, as disclosed in my co-pending application Serial No. 189,345, filed October 5, 1950—such curvature having no deleterious effect on the effectiveness with which the currently disclosed reed structure minimizes the rate of abstraction of energy.

In Figures 4 and 5 I have shown a reed structure in which the relative orientations, of lug and active portions, above defined are achieved in a different manner—not involving twisting, but still much simpler than machining, welding or the like. Herein the reed structure is designated generally as 11. It may be formed from a rod of circular cross-section, a portion of such section appearing as 13. To the right of the portion 13 the rod has been flattened (as by suitable pressing or rolling operations) along an axial plane to form the elongated active reed portion 12, while to the left of the portion 13 the rod has been flattened, along a second axial plane at right angles to the first, to form the lug portion 14. Preferably, of course, the rod after the flattenings will have been subjected to suitable heat treatment to relieve stresses imparted to the rod by that working. In the lug portion 14 there may be provided the hole 15 to accommodate a screw 16 which will clamp the reed structure to the base.

It will be understood that in this reed structure the circularly cross-sectioned portion 13 becomes substituted for the twisted portion 3 of earlier figures. The effectiveness of the structure, in minimizing the rate of abstraction of the reed's vibratory energy is, however, essentially identical with that of the earlier-described reed structure. It will of course be understood that the axial length of the portion 13 may be reduced essentially to zero, it having been shown in the illustrated length simply for convenience of illustration and description.

Figures 4 and 5 show a hammer 10 for impulse excitation of the reed in the direction $a$—$a$. They also show a reed-mounting base in the form of a relatively massive member 20 from which for each reed there may extend, typically upwardly, a respective stud 19 provided with a transverse slot 18. The reed lug portion 14 may be clamped against the face of the stud 19 by the screw 16, of which the body passes through the slot 18 and therebeyond carries the nut 17 tightened against the opposite face of the stud 19.

Figures 4 and 5 further show mechanico-electric translating apparatus associated with the reed. While no limitation to such form is intended, such apparatus has for simplicity been shown in the form of a thin electrode 21 supported in any convenient manner in closely spaced relationship to the free extremity of the reed, and a thin electrode 22 supported in any convenient manner in closely spaced relationship to the side of the reed (for example, opposite the node for the second partial of the reed vibration). Each electrode may for example be slightly displaced from the plane of rest position of the reed. The electrodes 21 and 22 and the reed (the latter through the stud 19 and member 20, both of which will typically be electrically conductive) may be connected by respective conductors 23, 24 and 25 to appropriate input terminals of the translator-amplifier unit 26, to the output of which may for example be connected a loudspeaker 27. The translator portion of the unit 26 may operate in any desired manner—for example by D.C.-modulation response to the vibratory variation of the reed-to-electrode capacities, or by carrier-amplitude-modulation response to such variation, or by carrier-frequency-modulation response to such variation, for all of which the appropriate structures and modes of operation are well known and need not be here shown or described. It will of course be understood that the joint use of electrodes 21 and 22 would be for purposes of particular or alterable tonal effects, and that a usable system would of course be provided by the use of either one or the other.

In the structure of Figures 4 and 5 it is desirable that either the hole 15 through the reed lug portion or the slot 18, or both, be somewhat larger than the diameter of the body of screw 16; this affords some adjustability of the spacing between the free extremity of the reed and the electrode 21. Adjustability of the vertically-shown relationship between the reed and either electrode 21 or 22 is of course inherently provided by the rotatability of the reed about the screw 16. The structure does not, however, provide for ready adjustability (except by bending of the reed, or movement of the electrode) of the spacing between the side of the reed and the electrode 22.

It will of course be understood that there is no peculiar relationship of the particular reed structure shown in Figures 4 and 5, as distinguished from that of Figures 1 and 2, to the reed-mounting and other features of Figures 4 and 5, and that the reed structure of earlier figures could equally well be employed in the background of Figures 4 and 5.

In Figures 6 and 7 I show a further modified reed structure, designated generally as 31, embodying the broad principles of the invention. Herein there appear the active reed portion 32 and the twisted portion 33 each quite analogous to the portions 2 and 3 of Figures 1 and 2. The reed lug portion 34 in its part most closely adjacent the twisted portion 33 may also be quite analogous to the corresponding part of the lug portion 4 of earlier figures; but in its further parts the lug portion 34 may be formed into a tube (sufficiently longer original material being provided for the purpose) whose axial dimension corresponds in magnitude and direction to the major transverse dimension of the lug portion of Figures 1 and 2. It will of course be appreciated that along any transverse section through the material of the tubular lug portion 34—purely by way of example, along the section designated by the lines in Figure 7—the material of the lug portion is of generally retcangular cross-section and has a major transverse dimension responding to similar magnitude and direction limitations.

The reed structure 31 may be mounted to any suitable base 39 by means of a screw 36 passing longitudinally through the tubular lug portion 34, that portion being clamped between the head of the screw and the base 39. If, as is preferable, the body of the screw 36 be of diameter somewhat smaller than the internal dimension of the tubular lug portion 34, there is provided some adjustability of the spacing between the free extremity of the reed and the electrode 21, which is shown in these figures quite analogously to its showing in Figures 4 and 5. The electrode 22 is shown in these figures quite analogously to its showing in those, and adjustability of the spacing between the side of the reed and the electrode 22 is inherently provided by the rotatability of the reed about the screw 36. This structure does not, however, provide for ready adjustability (except by bending of the reed, or movement of the involved electrode) of the vertically-shown relationship between the reed and either electrode 21 or 22.

The structure of Figures 6 and 7 is of the same satisfactory efficacy of operation, in respect of minimization of the rate of abstraction of the reed's vibratory energy, as are those of earlier figures.

In Figures 8 and 9 I show an embodiment of my invention in which there is employed a reed structure 41 quite similar to that of Figures 1 and 2 (except that no hole through the lug portion need be provided), and in which there is afforded ready adjustability of the spacing of the reed from such an electrode as 21, of the spacing of the reed from such an electrode as 22, and of the vertically-shown relationships of the reed to both of those electrodes.

In Figures 8 and 9 the active, twisted and lug portions of the reed are again designated as 2, 3 and 4, respectively. The lug portion 4 is fitted into a slot 48 extending from the outer extremity of a post 49 (individual to each reed structure 41) longitudinally of the post for a major portion of its length—the posts 49 forming portions of the reed-mounting base, of which the further portion (common to all or a group of reeds) may for example be an inverted-L-shaped member 50. The inner extremity of each post 49 may be securely held to one leg of the member 50 by a respective screw 46 passing through that member into threaded engagement with an internal hole 47 in that post. To achieve a clamping of the lug portion 4 in the slot 48, the post 49 may be externally provided with a tapered thread, and a nut 45 may be screwed inwardly onto the post until the resulting contraction of the walls of the slot 48 securely clamps the reed lug portion 4 between those walls.

Hammer 10, electrodes 21 and 22, conductors 23, 24 and 25 (the latter for example connected to the reed through a lug 28 under the head of screw 46, which is connected to the reed through the post 49 which may be of conductive material), and the translator-amplifier unit 26 and loudspeaker 27 may be provided as before.

It will be appreciated that, upon slight loosening of one of the nuts 45, the respective reed structure 41 may readily be adjusted (by movement of the lug portion 4 within the slot 48) for any desired spacing of its free extremity from the electrode 21 and (within limits) for desired vertically-shown relationships to both of the electrodes 21 and 22—while upon slight loosening of the screw 46 the reed structure may readily be adjusted for any desired spacing of its edge from the electrode 22.

While I have disclosed my invention in terms of particular embodiments thereof, I intend no unnecessary limitations thereby. Modifications in many respects will be suggested by my disclosure to those skilled in the art, and such modifications will not necessarily constitute departure from the spirit or scope of the invention, which I undertake to define in the following claims.

I claim:

1. In combination in a musical instrument including a reed-mounting base: a tuned reed comprising an elongated actitve portion and a lug portion secured to said base, each of said portions being of generally rectangular transverse cross-section and each having a major transverse dimension substantially at right angles to that of the other; and external exciting means, associated with and directly effective on said active reed portion, for exciting the same into vibration in a direction generally normal to its major transverse dimension.

2. In combination in a musical instrument including a reed-mounting base: a tuned reed comprising an elongated active portion, a lug portion secured to said base, and a portion intervening said lug and active portions, each of said portions being of generally rectangular transverse cross-section and said intervening portion comprising a twist through an angle approximating a right angle; and external exciting means, associated with and directly effective on said active reed portion, for exciting the same into vibration in a direction generally coincident with its smaller transverse dimension.

3. In a musical instrument including a reed-mounting base and means for exciting a tuned reed secured thereto: a tuned reed comprising an elongated active portion contacted by said exciting means and thereby directly excitable into transverse vibration; a lug portion, secured to said base, of material of generally rectangular transverse cross-section, having its major transverse dimension substantially parallel to a plane passing longitudinally through said active reed portion parallel to the direction of said vibration; and a portion comprising a twist intervening between said lug and active portions.

4. In a musical instrument including a reed-mounting base and means for exciting a tuned reed secured thereto: a tuned reed comprising an elongated active portion of generally rectangular transverse cross-section contacted by said exciting means and thereby directly excitable into vibration; a lug portion, secured to said base, of material of generally rectangular transverse cross-section, having a minor transverse dimension substantially similar to that of said active reed portion and a major transverse dimension substantially parallel to a plane passing longitudinally through said active reed portion parallel to the direction of said vibration; and a portion comprising a twist intervening between said lug and active portions, 5. In a musical instrument including a reed-mounting base and means for exciting a tuned reed secured thereto: a tuned reed comprising an alongated active portion of generally rectangular transverse cross-section contacted by said exciting means and thereby directly excitable into vibration. secured to said base, of material having a transverse cross-section substantially similar to that of said active reed portion and a major transverse dimension substantially parallel to a plane passing longitudinally through said active reed portion parallel to the direction of said vibration; and a portion comprising a twist intervening between said lug and active portions.

6. In a musical instrument including means for exciting a tuned reed: the combination of a tuned reed comprising an elongated active portion contacted by said exciting means and thereby directly excitable into transverse vibration and a lug portion of generally rectangular transverse cross-section having its major transverse dimension substantially parallel to a plane passing longitudinally through said active reed portion parallel to the direction of said vibration; and a reed-mounting base provided with a slot substantially parallel to the direction of said vibration and accommodating the minor transverse dimension of said lug portion, said lug portion being clamped in said slot.

7. In a musical instrument, the combination of a tuned reed comprising an elongated active portion and a lug portion, each of said portions being of generally rectangular transverse cross-section and having a major transverse dimension substantially at right angles to that of the other; external exciting means, associated with and directly effective on said active reed portion, for exciting the same into vibration in a direction generally normal to its major transverse dimension; mechanico-electric translating means in spaced relationship to the side of said active reed portion; and a reed-mounting base comprising a post swivellable about an axis, said lug portion being secured to said post with its major transverse dimension substantially parallel to said axis.

8. In a musical instrument, the combination of a tuned reed comprising an elongated active portion contacted by said exciting means and thereby directly excitable into transverse vibration, and a lug portion of generally rectangular transverse cross-section and having a major transverse dimension substantially parallel to a plane passing longitudinally through said active reed portion parallel to the direction of its vibration; mechanico-electric translating means in spaced relationship to the side of said active reed portion and swept past by said active reed portion in its vibration; and a reed-mounting base comprising a post swivellable about an axis, said lug portion being secured to said post with its major transverse dimension substantially parallel to said axis.

9. In a musical instrument including a reed-mounting base and means for exciting a tuned reed secured thereto: a tuned reed comprising an elongated active portion contacted by said exciting means and thereby directly excitable into transverse vibration; a lug portion secured to said base, said lug portion being substantially in the form of a tube whose axial dimension is substantially greater than its wall thickness and is substantially parallel to a plane passing longitudinally through said active reed portion parallel to the direction of said vibration; and a portion comprising a twist intervening between said lug and active portions.

10. In a musical instrument including a reed-mounting base and means for exciting a tuned reed secured thereto: a tuned reed comprising an elongated active portion of generally rectangular transverse cross-section contacted by said exciting means and thereby directly excitable into transverse vibration; a lug portion secured to said base, said lug portion being substantially in the form of a tube whose wall thickness is substantially similar to the minor transverse dimension of said active reed portion and whose axial dimension is substantially greater than said wall thickness and is substantially parallel to a plane passing longitudinally through said active reed portion parallel to the direction of said vibration; and a portion comprising a twist intervening between said lug and active portions.

11. In a musical instrument including a reed-mounting base and means for exciting a tuned reed secured thereto: a tuned reed comprising an elongated active portion of generally rectangular transverse cross-section contacted by said exciting means and thereby directly excitable into transverse vibration; a lug portion secured to said base, said lug portion being substantially in the form of a tube whose wall cross-section is substantially similar to the transverse cross-section of said active reed portion and whose axis is substantially parallel to a plane passing longitudinally through said active reed portion parallel to the direction of said vibration; and a portion comprising a twist intervening between said lug and active portions.

References Cited in the file of this patent

UNITED STATES PATENTS

| | | |
|---|---|---|
| 365,412 | Steck | June 28, 1887 |
| 1,481,072 | Smith | Jan. 15, 1924 |
| 2,521,401 | Ohman et al. | Sept. 5, 1950 |
| 2,581,963 | Langloys | Jan. 8, 1952 |
| 2,655,069 | Marshall | Oct. 13, 1953 |
| 2,656,755 | Miessner | Oct. 27, 1953 |